Sept. 8, 1931.   E. H. WEBB ET AL   1,822,681
LOCK FOR AUTOMOBILES
Filed March 12, 1928
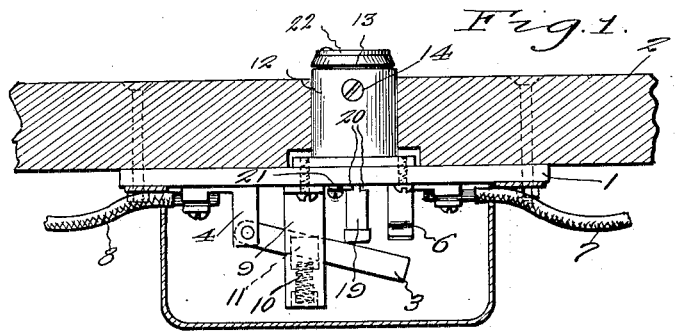
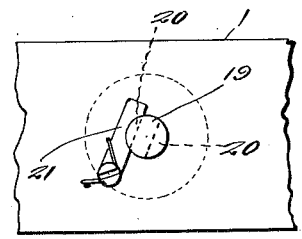
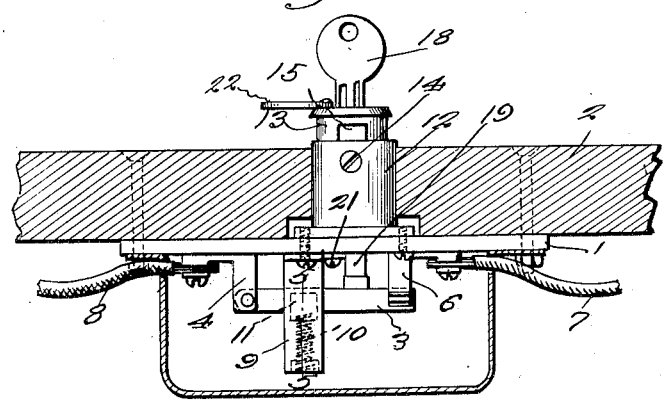
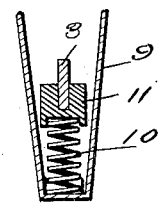
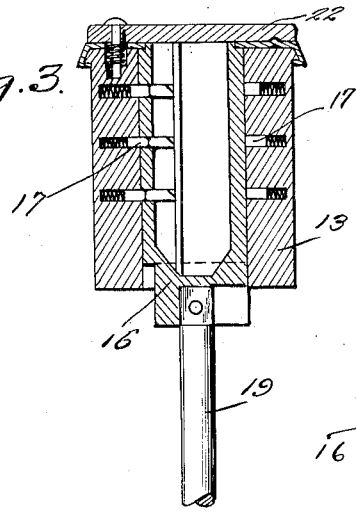
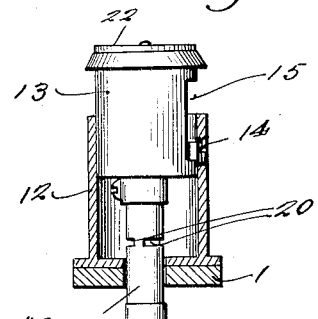
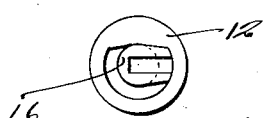
E. H. Webb
C. C. Berry
INVENTOR
BY Victor J. Evans
ATTORNEY
WITNESS:

Patented Sept. 8, 1931

1,822,681

UNITED STATES PATENT OFFICE

ERNEST H. WEBB, OF DENVER, AND CLAUD C. BERRY, OF MONTROSE, COLORADO

LOCK FOR AUTOMOBILES

Application filed March 12, 1928. Serial No. 260,975.

This invention relates to a lock for motor vehicles, the general object of the invention being to provide a lock controlled switch for breaking the circuit of the electric system of the vehicle when the owner or driver leaves the vehicle so that the ignition system, the lighting system and the alarm system are rendered inoperative, thus preventing an unauthorized person from going off with the vehicle and also reducing the fire hazards, due to short circuiting of the wires and other electrical parts of the vehicle.

Another object of the invention is to so construct the switch and its lock that it can be manufactured to sell at low cost, can be easily installed and can be operated by the key of the lock.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a view partly in section, showing the improved lock fastened to a floor board or other part of a vehicle, with the lock holding the switch in open position.

Figure 2 is a similar view but showing the switch closed and the lock in unlocking position.

Figure 3 is a sectional view through the lock.

Figure 4 is a view of the inner end of the lock and showing the latch member for holding the lock bolt in its projected position.

Figure 5 is a section on line 5—5 of Figure 2.

Figure 6 is a view of the lock and its casing, the casing being shown in section.

Figure 7 is a view of the receiving end of the key barrel.

In these views, 1 indicates a switch base which is fastened to the under side of a floor board 2 of a motor vehicle or other part thereof and 3 indicates a switch lever which is pivoted to the bracket 4 fastened to the base and which is adapted to engage the spring arms of the bracket 6 which is also fastened to the base, the base being of non-conducting material and the brackets of conducting material so that when the lever is in engagement with the bracket 6, current will pass from one bracket to the other over said lever. A conductor 7 is connected with one bracket and a conductor 8 is connected with the other bracket, the switch being so arranged that when it is in open position, it will break the circuits to all the electrical appliances of the vehicle.

A substantially V-shaped member 9 depends from the base and straddles the lever and a spring 10 is carried by the lower part of this member and engages a block 11 of non-conducting material which is connected with the lever, said spring normally holding the lever in closed position.

A casing 12 is secured to the upper face of the base and passes through a hole in the floor board, the top of the casing being open. A lock casing 13 is slidably mounted in the casing 12, the sliding movement being limited by means of a set screw 14 in the casing 12 engaging a groove 15 in the casing 13. A key barrel 16 is rotatably mounted in the lock casing 13, the barrel being normally held against rotary movement by the usual tumblers 17 which are moved to neutral position when a key, such as shown at 18, is pushed into the keyhole in the barrel. A depending stem 19 has its upper end fastened to the lower end of the barrel and said stem passes through a hole in the base 1 to a point where it will engage the lever 3 when the lever is in raised position. This stem is provided with a pair of oppositely arranged notches 20 and a spring actuated latch arm 21, fastened to the under side of the base 1, will engage one of these notches when the lock casing is moved downwardly, thus holding the casing and its associated parts in lowered position with the stem holding the lever 3 out of contact with the bracket 6. Thus the circuit will be broken when the lock casing is pushed downwardly. When the vehicle is to be used again, the key is inserted in the lock so as to move the tumblers to neutral position and then the key is turned so as to rotate the barrel 16 in the casing 13, which will cause a portion of the stem between the notches 20 to engage the edge of the latch arm 21 so as to free the stem from the arm and then the spring 10 will push the lever 3 to closed position and this lever in turn, engaging the stem, will raise the lock parts to normal position. The circuit will then be closed and the vehicle can function as usual.

A spring actuated cover plate 22 is provided for covering the keyhole when the key is removed therefrom.

It is thought from the foregoing description that the advantages and novel features of our invention will be readily apparent.

It is to be understood that we may make changes in the construction and in the combination and arrangement of the several parts, provided that such changes fall within the scope of the appended claim.

What we claim is:—

A switch lock comprising a casing, a lock casing slidably mounted therein, a key barrel rotatably mounted in the lock casing, a stem extending from the inner end of the key barrel, and provided with a notch, a switch comprising a pivoted contact member and spaced contact members to be bridged thereby when the pivoted member is in one position of its swinging movement, a spring yieldably urging the pivoted contact member to such position, the said stem engaging the upper side of the said pivoted contact member, a latch element yieldably held in contact with the stem and engageable in the notch therein to hold the stem in lowered position and the pivoted member of the switch out of engagement with the spaced members, when the key barrel is lowered in the casing, the stem, at one side of the notch, being engageable against the latch, when the key barrel is rotated to unlocked position, to permit shifting of the key barrel and swinging movement of the pivoted contact member to engagement with the spaced contact members, through the action of the spring.

In testimony whereof we affix our signatures.

CLAUD C. BERRY.
ERNEST H. WEBB.